United States Patent
Rapp et al.

(10) Patent No.: US 12,474,954 B2
(45) Date of Patent: *Nov. 18, 2025

(54) EFFICIENT INITIATION OF AUTOMATED PROCESSES

(71) Applicant: TRUIST BANK, Charlotte, NC (US)

(72) Inventors: Edward Rapp, Columbus, GA (US); Kacy Howard, Atlanta, GA (US)

(73) Assignee: Truist Bank, Charlotte, NC (US)

( * ) Notice: Subject to any disclaimer, the term of this patent is extended or adjusted under 35 U.S.C. 154(b) by 633 days.

This patent is subject to a terminal disclaimer.

(21) Appl. No.: 17/680,732

(22) Filed: Feb. 25, 2022

(65) Prior Publication Data

US 2023/0082648 A1   Mar. 16, 2023

Related U.S. Application Data (63) Continuation of application No. 17/476,898, filed on Sep. 16, 2021.

(51) Int. Cl.
| | |
|---|---|
| *G06F 9/48* | (2006.01) |
| *G06F 9/50* | (2006.01) |
| *G06F 9/54* | (2006.01) |

(52) U.S. Cl.
CPC .......... *G06F 9/4881* (2013.01); *G06F 9/5016* (2013.01); *G06F 9/541* (2013.01)

(58) Field of Classification Search
None
See application file for complete search history.

(56) References Cited

U.S. PATENT DOCUMENTS

| | | | |
|---|---|---|---|
| 9,043,870 B1 | 5/2015 | Barenholz et al. | |
| 10,671,981 B2* | 6/2020 | Johnston | G06Q 40/02 |
| 11,340,872 B1 | 5/2022 | Vanantwerp et al. | |
| 2016/0147828 A1 | 5/2016 | Yu et al. | |
| 2017/0070500 A1* | 3/2017 | Hockey | H04L 9/3228 |
| 2022/0217154 A1* | 7/2022 | Song | H04L 51/48 |

OTHER PUBLICATIONS

Non-Final Office Action, U.S. Appl. No. 17/476,898, Apr. 29, 2024, 47 pages.

* cited by examiner

*Primary Examiner* — Bradley A Teets
*Assistant Examiner* — Melissa A Headly
(74) *Attorney, Agent, or Firm* — Kilpatrick Townsend & Stockton LLP; Michael A. Springs, Esq.

(57) ABSTRACT

A server can be configured for efficiently initiating automated processes. The server can receive data, which can include at least an entity name, about a first entity. The server can pre-fill a digital form for a second entity using the data about the first entity. The digital form can include the entity name. The server can receive an indication of approval from the second entity relating to the digital form. The server can compare the entity name included in the digital form to a reference table for determining an entity identification. The server can, in response to determining the entity identification, initiate an interaction with the first entity on behalf of the second entity. The interaction can include one or more automated processes.

20 Claims, 4 Drawing Sheets

EFFICIENT INITIATION OF AUTOMATED PROCESSES

CROSS-REFERENCE TO RELATED APPLICATION

This is a continuation of co-pending U.S. patent application Ser. No. 17/476,898, filed Sep. 16, 2021, and titled "Efficient Initiation of Automated Processes," the entirety of which is hereby incorporated herein by reference.

TECHNICAL FIELD

This disclosure generally relates to automated computing processes and, more specifically (but not by way of limitation) to efficient initiation and management of automated processing operations.

BACKGROUND

Automated processes can decrease an amount of time used to perform various operations. For example, some automated computing processes can reduce time to perform the various operations since no human or otherwise manual intervention is used to perform the operations. Other servers or other computing systems can use automated processes to perform the various operations. The other servers may transmit data for initiating the automated processes. But, the other servers may be slow or otherwise inefficient due to using unverified or otherwise uncontrolled data for initiation the automated processes. Additionally, an amount of memory used to initiate and manage the automated processes may be excessively high while an efficiency of memory usage for initiating and managing the automated processes may be low.

SUMMARY

In one example, a server can be configured for efficiently initiating automated processes. The server can include a processing device and a non-transitory computer-readable medium. The non-transitory computer-readable medium can include instructions that are executable by the processing device to cause the server to perform various operations. The server can receive data about a first entity. The received data can include at least an entity name. The server can pre-fill a digital form for a second entity using the data about the first entity. The digital form can include the entity name. The server can receive an indication of approval from the second entity relating to the digital form. The server can compare the entity name included in the digital form to a reference table for determining an entity identification based on the entity name. The server can, in response to determining the entity identification, initiate, by using the digital form and the entity identification, an interaction with the first entity on behalf of the second entity. The interaction can include one or more automated processes.

In another example, a method can be used to efficiently initiate automated processes. Data about a first entity can be received. The data can include at least an entity name. A digital form can be pre-filled for a second entity by using the data about the first entity. The digital form can include the entity name. An indication of approval can be received from the second entity and can be related to the digital form. The entity name included in the digital form can be compared to a reference table for determining an entity identification based on the entity name. In response to determining the entity identification, an interaction can be initiated by using the digital form and the entity identification. The interaction can include an automated process with the first entity on behalf of the second entity.

In another example, a non-transitory computer-readable medium can include instructions that are executable by a processing device for performing various operations for efficiently initiating automated processes. Data about a first entity can be received. The data can include at least an entity name. A digital form can be pre-filled for a second entity by using the data about the first entity. The digital form can include the entity name. An indication of approval can be received from the second entity and can be related to the digital form. The entity name included in the digital form can be compared to a reference table for determining an entity identification based on the entity name. In response to determining the entity identification, an interaction can be initiated by using the digital form and the entity identification. The interaction can include an automated process with the first entity on behalf of the second entity.

DETAILED DESCRIPTION

Certain aspects and features of the present disclosure relate to efficiently initiating and managing automated processes by receiving and verifying input data before initiating an automated process. The automated processes can include computing processes that can transfer various materials such as data. The automated process can involve a first entity, a second entity, and other suitable entities. The input data can include one or more entity names (e.g., relating to the first entity and the second entity, etc.), an entity identification, and other suitable input data that can be used to initiate the automated processes. Initiating the automated process can include transmitting a pre-filled digital form to a first entity in which the pre-filled digital form can be approved or otherwise authorized by a second entity. The pre-filled digital form, or a subset thereof, can be validated or verified prior to initiating the automated process. For example, the entity name can be determined to match or otherwise correspond to an entity name included in a reference table that can include a set of entity names corresponding to a set of entity identifications. The reference table can be used to validate the pre-filled digital form and to determine an entity identification that can be used to initiate the automated process Other servers or computing systems may not be able to efficiently initiate or manage automated processes. For example, while the other servers can initiate automated processes with a first entity, the other servers may not validate or verify data submitted for initiating the automated process before initiating the automated process with the first entity. This lack of validation or verification can cause the automated process to be delayed. For example, the first entity may return the data or otherwise deny the automated process due to incompleteness or incorrectness associated with the data. Accordingly, the other servers or computing systems may use additional computational memory for gathering additional data and re-submitting the data for re-initiating the automated process. Additionally, due to the lack of validation or verification, mistakes may be encountered in the automated process or in the initiation of the automated process, and the mistakes may cause security concerns related to the data transmitted for initiating the automated process.

A server (e.g., the server described herein) can efficiently initiate one or more automated processes and can reduce a risk of data mismanagement associated with the automated processes. The server can validate or verify data before transmitting the data for initiating an automated process. For example, the server can receive data about a first entity from a second entity and can pre-fill a digital form using the received data. The data can include an entity name associated with the first entity. The server can use a reference table to validate or verify the data to increase an accuracy of the pre-filled digital form. For instance, the reference table can include pre-existing data (e.g., an entity identification, etc.) about the first entity that can be used to increase the accuracy of the pre-filled digital form. Once validated, the pre-filled digital form can be transmitted (e.g., via one or more application programming interface (API) calls) for initiating the automated process.

By validating the pre-filled digital form the server may use less computer memory than the other servers for similar operations. For example, the server may receive fewer instances of denied automated processes or requests for additional information from the first entity since the pre-filled digital form is validated before initiating the automated process. In this example, less memory is used since the automated process is initiated only once. Additionally, by validating the pre-filled digital form, the server can increase a security of data involved in the automated process. For example, the server may cause fewer mistakes to be made, due validation of the data prior to initiating the automated process, during the automated process with respect to the data, and fewer mistakes may yield a lower risk of data breach or unintentional disclosure of sensitive data.

Figure 1:
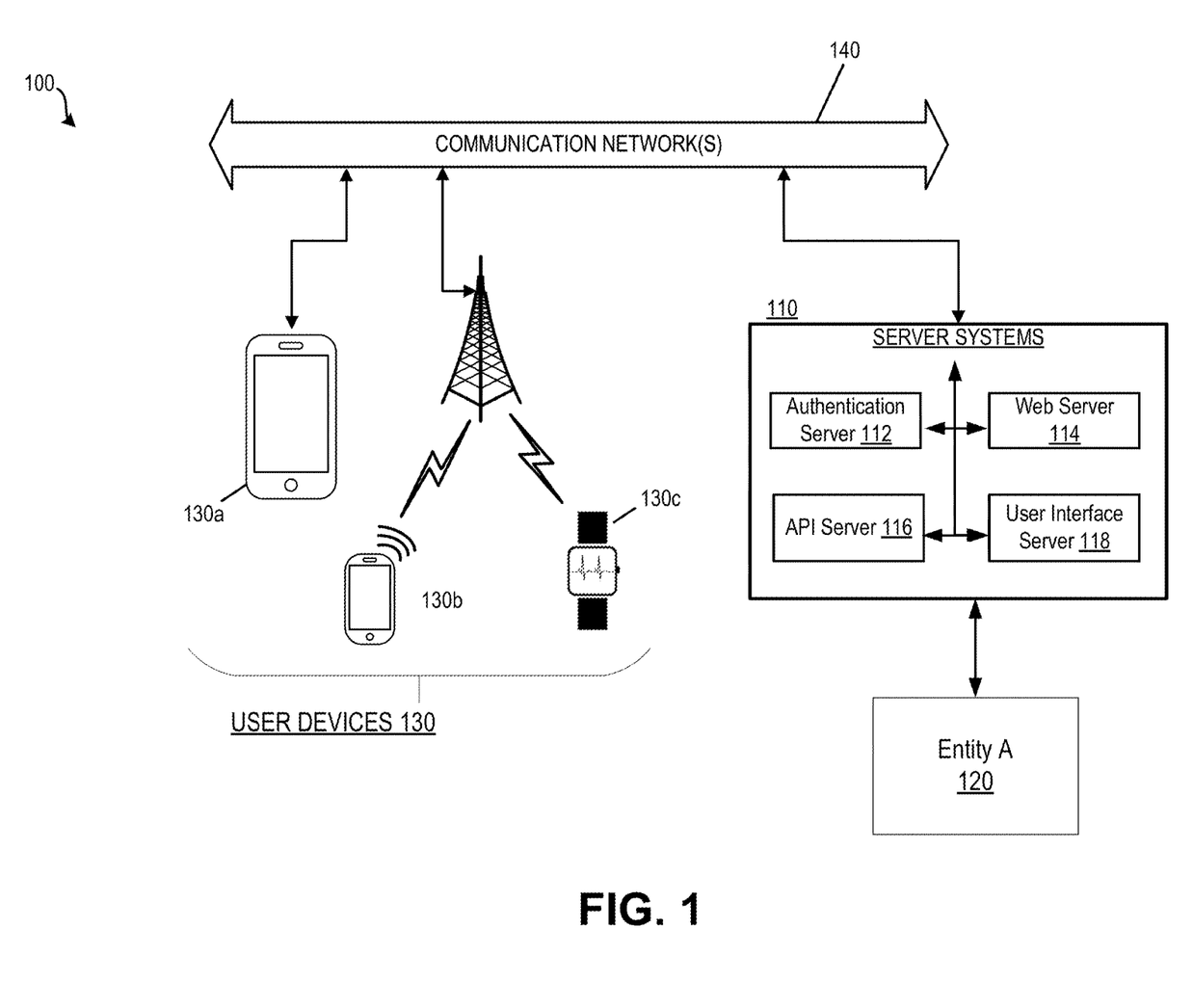
FIG. 1 is a schematic of a network environment in which automated processes can be efficiently initiated according to one aspect of the present disclosure.

FIG. 1 is a schematic of a network environment 100 in which automated processes can be efficiently initiated according to one aspect of the present disclosure. The network environment 100 can include user devices 130, one or more communication networks 140, and a server system 110. The user devices 130 may request and access resources within the server system 110 over one or more communications networks 140. The network environment 100 may correspond to a Wide Area Network ("WAN") environment, such as the Internet, through which the user devices 130 may communicate with servers (e.g., the server system 110) via web browsers or client-side applications, to establish communication sessions, request and receive web-based resources, and access other suitable features of applications or services.

The server system 110 may be communicatively coupled to entity A 120 and to other suitable entities, for facilitating automated processes, through one or more networks. Entity A 120 may be financial account data systems that include account data that are intended to be transferred to the server system 110 or to other suitable components. The server system 110 may be or include any type of server including, for example, a rack server, a tower server, a miniature server, a blade server, a mini rack server, a mobile server, an ultra-dense server, a super server, or the like. The server system 110 may include various hardware components such as, for example, a motherboard, processing units, memory systems, hard drives, network interfaces, power supplies, etc. The server system 110 may include one or more server farms, clusters, or any other appropriate arrangement or combination of computer servers. Additionally, the server system 110 may act according to stored instructions located in a memory subsystem of the server system 110 and may execute an operating system or other applications.

The server system 110 may implement several different applications and services, and perform additional server-side functionality, including by an authentication server 112, a web server 114, an API server 116, a user interface server 118, or other suitable servers. For example, in implementations of banking or financial services systems, electronic commerce systems, and the like, the web-based resources provided by web server 114 may be used by user devices 130 to access account information and perform various functions related to financial accounts. The API server 116 may be communicatively coupled to the user interface server 118, to entity A 120, and to other suitable components or systems, such that the API server 116 can make API calls to entity A 120 for initiating automated processes, in some examples based on input from the user interface server 118. The API calls may include requests to execute certain automated financial functions, such as transferring money, accounts, etc., and entity A 120 may execute the automated financial functions using one or more automated processes such as the Automated Customer Account Transfer Service (ACATS), straight-through processing, or other suitable automated processes. Entity A 120 may store information for the server system 110 to implement functions relating to account access, permissions, financial services, and the like. In some examples, the authentication server 112 can be used to validate data (e.g., using a reference table or other suitable techniques, etc.) prior to initiating automated processes.

The user devices 130, which can include suitable user devices for accessing web-based resources or application-based resources, can be capable of accessing and establishing communication sessions with the server system 110 and the financial systems 120 and 122 through the communication networks 140. As illustrated in FIG. 1, user devices 130a-130c correspond to mobile devices, including tablet computers 130a, smartphones 130b, and smart watches 130c, which may access the server system 110 via a Local Area Network ("LAN") or Wide Area Network (WAN), as well as mobile telecommunication networks, short-range wireless networks, or various other communication network types (e.g., cable or satellite networks). Although certain examples herein are described in terms of mobile devices 130, in other examples, the user devices 130 may additionally or alternatively include other mobile or non-mobile computing devices capable of accessing the server system 110 via the communications network 140.

Although certain components are shown in FIG. 1, other suitable, compatible, network hardware components and network architecture designs may be implemented in various embodiments to support communication between the server system 110, entity A 120, and various user devices 130. Such communication network(s) may be any type of network that can support data communications using any of a variety of commercially-available protocols, including, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, the network(s) connecting the user devices 130 and server system 110 in FIG. 1 may be local area networks (LANs), such as one based on Ethernet, Token-Ring or the like. Such network(s) also may be wide-area networks, such as the Internet, or may include financial/banking networks, telecommunication networks such as a public switched telephone networks (PSTNs), cellular or other wireless networks, satellite networks, television/cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
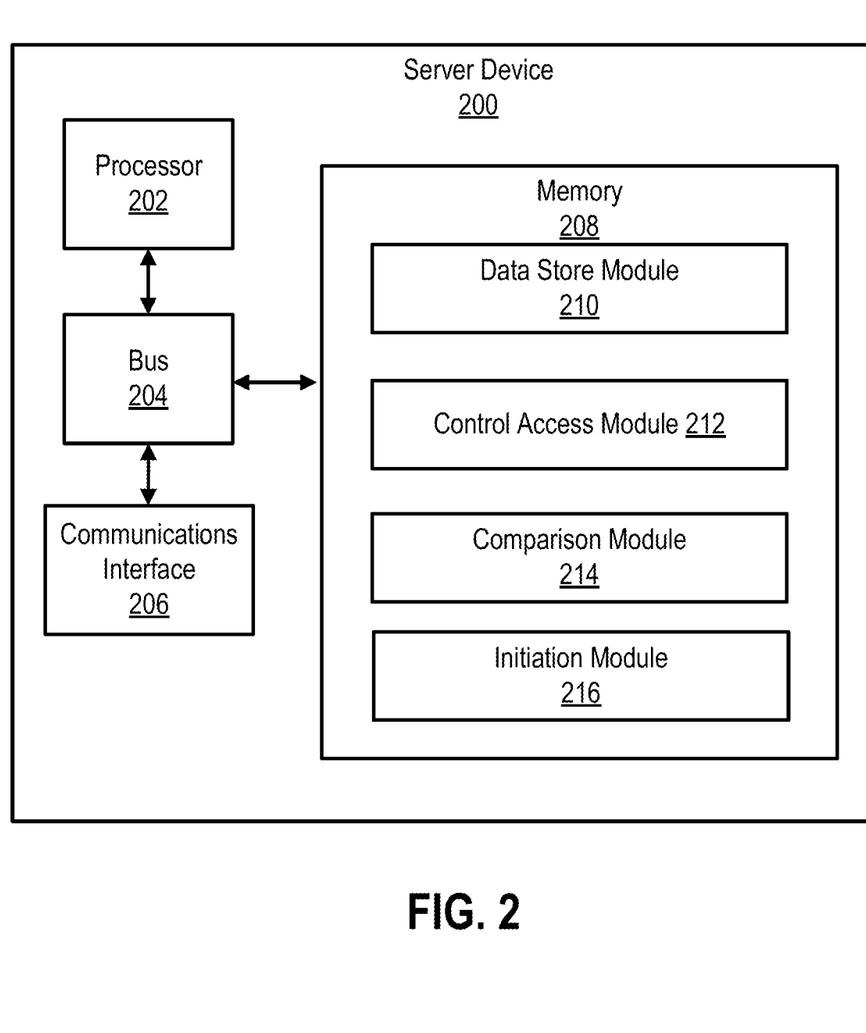
FIG. 2 is a block diagram of an example of a server device configured to efficiently initiate automated processes according to one example of the present disclosure.

FIG. 2 is a block diagram of an example of a server device 200 configured to efficiently initiate automated processes according to one example of the present disclosure. The server device 200 may be a network device and may include a processor 202, a bus 204, a communications interface 206, and a memory 208. In some examples, the components shown in FIG. 2 may be integrated into a single structure. For example, the components can be within a single housing. In other examples, the components shown in FIG. 2 can be distributed (e.g., in separate housings) and in electrical communication with each other.

The processor 202 may execute one or more operations for implementing various examples and embodiments described herein. The processor 202 can execute instructions stored in the memory 208 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 may be communicatively coupled to the memory 208 via the bus 204. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 may include a medium from which the processor 202 can read instructions. A computer-readable medium may include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor may read instructions. The instructions may include processor-specific instructions generated by a compiler or an interpreter from code written in any suitable computer-programming language, including, for example, C, C++, C#, etc.

The communications interface 206 may interface with other network devices or network-capable devices to analyze and receive information related to accessing functions of an application. Information received from the communications interface 206 may be sent to the memory 208, or to other suitable components of the server device 200, via the bus 204. The memory 208 can store any information received from the communications interface 206.

The memory 208 may include program code for efficiently initiating an automated process by validating data prior to initiating the automated process. The program code may cause the server device 200, or any component within the server device 200, to pre-fill a digital document with data and to validate the data using a reference table. The program code can additionally cause the server device 200 to make one or more API calls for initiating the automated process. The API calls may cause the automated process to be initiated, in response to validating the received data, and may cause an account to be generated on the server device 200. The memory 208 may additionally include program code for a data store module 210, a control access module 212, a comparison module 214, and an initiation module 216.

The data store module 210 may store information relating to a user account (e.g., username and password, security information, transactional data) for a number of users and client devices 130, including originating IP addresses of login attempts, browser settings of login attempts, etc. The control access module 212 may validate whether a user access attempt has been successfully authenticated after a user has entered correct account login information. In some cases, the control access module 212 may additionally or alternatively determine the data system associated with account information of the user. Additionally, the control access module 212 can access or otherwise receive data from an entity (e.g., a user, etc.) indicating a request for a transfer of data, assets, or other suitable tangible or intangible property. The results from the control access module 212 may be used by the comparison module 214 to validate the received data. For example, the comparison module 214 can compare the received data to a reference table to determine an identification associated with the received data and to validate the data. Additionally or alternatively, the results from the control access module 212 and the comparison module 214 may be used by the initiation module 216 or other suitable component of the server device 200 to send a request to a separate entity (e.g., entity A or other suitable financial institution, etc.) for initiating the automated process. The initiation module 216 can make one or more API calls to the separated entity. For example, a first API call can include transmitting the identification to the separate entity to verify that the request for initiation is being properly transmitted. Additionally, a second API call can include transmitting data (e.g., a pre-filled digital form) to the separate entity for initiating the automated process.

Figure 3:
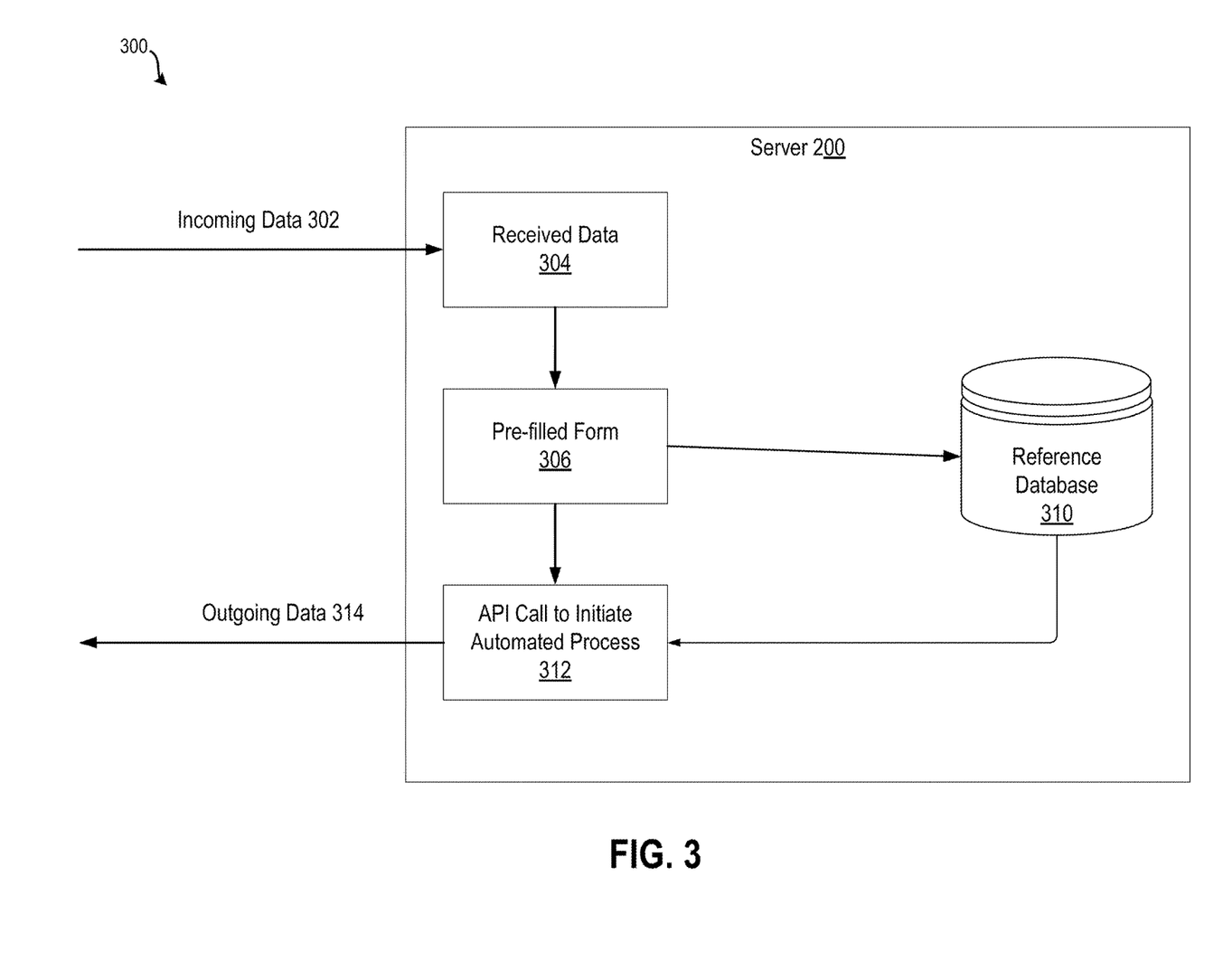
FIG. 3 is a flow diagram of an example of a dataflow usable for efficiently initiating automated processes according to one aspect of the present disclosure.

FIG. 3 is a flow diagram of an example of a dataflow 300 usable for efficiently initiating automated processes according to one aspect of the present disclosure. The dataflow 300 can involve the server 200 and other suitable computing devices or computing systems for efficiently initiating automated processes. Incoming data 302 can be received by the server as received data 304. The received data 304 can include data about a first entity (e.g., a financial institution or other suitable entity) a second entity (e.g., a user or other suitable entity), or other suitable entities. The received data 304 can include an entity name corresponding to the first entity, identification information relating to the second entity, and other suitable data.

The second entity, or other suitable entity can provide (e.g., via incoming data 302) the received data 304 to the server 200. In some examples, the server 200 can provide a user interface or other suitable interactive computing environment to allow the second entity to provide the received data 304. The second entity can input the received data 304 via the user interface. Additionally, the server 200, the user interface, other suitable entities (e.g., a financial aggregator), or a combination thereof can use the received data 304 to gather additional data. For example, the server 200 can retrieve held-away data (e.g., account information, etc.) about the second entity associated with the first entity. The server 200 or other suitable entity can retrieve other suitable data about the first entity, the second entity, or a combination thereof.

A pre-filled form 306 can be generated by the server 200. For example, the server 200 can use the received data 304 to generate the pre-filled form 306. The server 200 can pre-fill the form 306 using the entity name of the first entity, the identification information of the second entity, and other suitable information. In some examples, the pre-filled form 306 can be complete and can be used in subsequent operations. In other examples, the pre-filled form 306 may not be complete, and in these examples, the server 200 can request additional information. The server 200 can provide a subsequent user interface, or other suitable interactive computing environment, for allowing the second entity, or other suitable entity, to input any missing information associated with the pre-filled form 306. In some examples, the second entity can input an approval indicator, an authorization, or other suitable input for indicating that the pre-filled form 306 is complete and that the second entity approves of the pre-filled form 306. The approval indicator can allow the server 200 to submit the pre-filled form 306 for initiating one or more automated processes.

The pre-filled form 306, once complete, can be used to initiate various processes or for other suitable operations. The various processes can include automated computing processes and other suitable processes that can transfer data or other suitable property associated with the second entity. For example, the pre-filled form 306 can be or otherwise include a request to transfer assets, a user account, data, or other suitable tangible or intangible data associated with the second entity from the first entity to the server 200.

The server 200 may be able to submit the pre-filled form 306, but the server 200 may validate at least a subset of the data included in the pre-filled form 306. For example, some automated processes may use an entity identification instead of, or in addition to, the entity name. The entity identification can be determined or otherwise validated by the server 200. For example, the server 200 can compare the pre-filled form 306 (e.g., using the entity name) to a reference table that can be included in a reference database 310.

The reference table can include a set of entity names, a set of entity identifications, and other suitable information. The server 200 may generate the reference table based on data received from a third entity (e.g., a separate financial organization, etc.). The data received from the third entity may include lists of entity names and entity identifications, and the server 200 may parse the lists for generating the reference table. In some examples, the server 200 may periodically (e.g., each day, each week, each month, etc.) receive the lists and can use the lists to generate and to maintain (e.g., verify accuracy) the reference table.

The server 200 can use the reference table to perform the comparison. For example, the server 200 can compare the entity name of the pre-filled form 306 to the entity names included in the reference table. The server 200 may determine that the entity name of the first entity matches or otherwise corresponds to an entity name included in the reference table. The entity name of the reference table may correspond to an entity identification, and the server 200 may be configured to determine, based on the entity name of the reference table, the entity identification of the first entity. The server 200 can use the entity identification for various subsequent operations.

Upon determination and validation of the entity identification, the server 200 can use the entity identification and the pre-filled form 306 to initiate an automated process. In some examples, the server 200 may initiate the automated process by making one or more API calls (e.g., at 312). A first API call, from the server 200 to the first entity, can be made, which can include transmitting the entity identification, by the server 200 to determine whether the automated process can proceed. For example, the first API call can be used to determine if the first entity is compatible with or otherwise supports the automated process. If the first API call returns positive, then the server 200 can make a second API call to the first entity. The second API call can include the server 200 transmitting the pre-filled form 306, via outgoing data 314, to the first entity for causing the automated process to be initiated.

In response to the first entity, or other suitable entity performing the automated process, the server 200 may generate an account associated with the second entity. For example, the first entity may transfer account data, assets, or other suitable tangible or intangible property associated with the second entity to the server 200, and the server 200 can use this information to generate the account.

In some examples, pre-filling and validating data (e.g., the comparison described herein) can allow the server 200 to use less computer memory and use computer memory more efficiently for initiating and managing the automated process. For example, a smaller percentage of initiated automated processes may be denied or otherwise returned for inaccuracies or incompleteness. Additionally, a security of the automated processes may be increased due to the validation of the entity identification (e.g., the entities in question can be verified, which may cause a decrease in mistakes when handling sensitive data).

Figure 4:
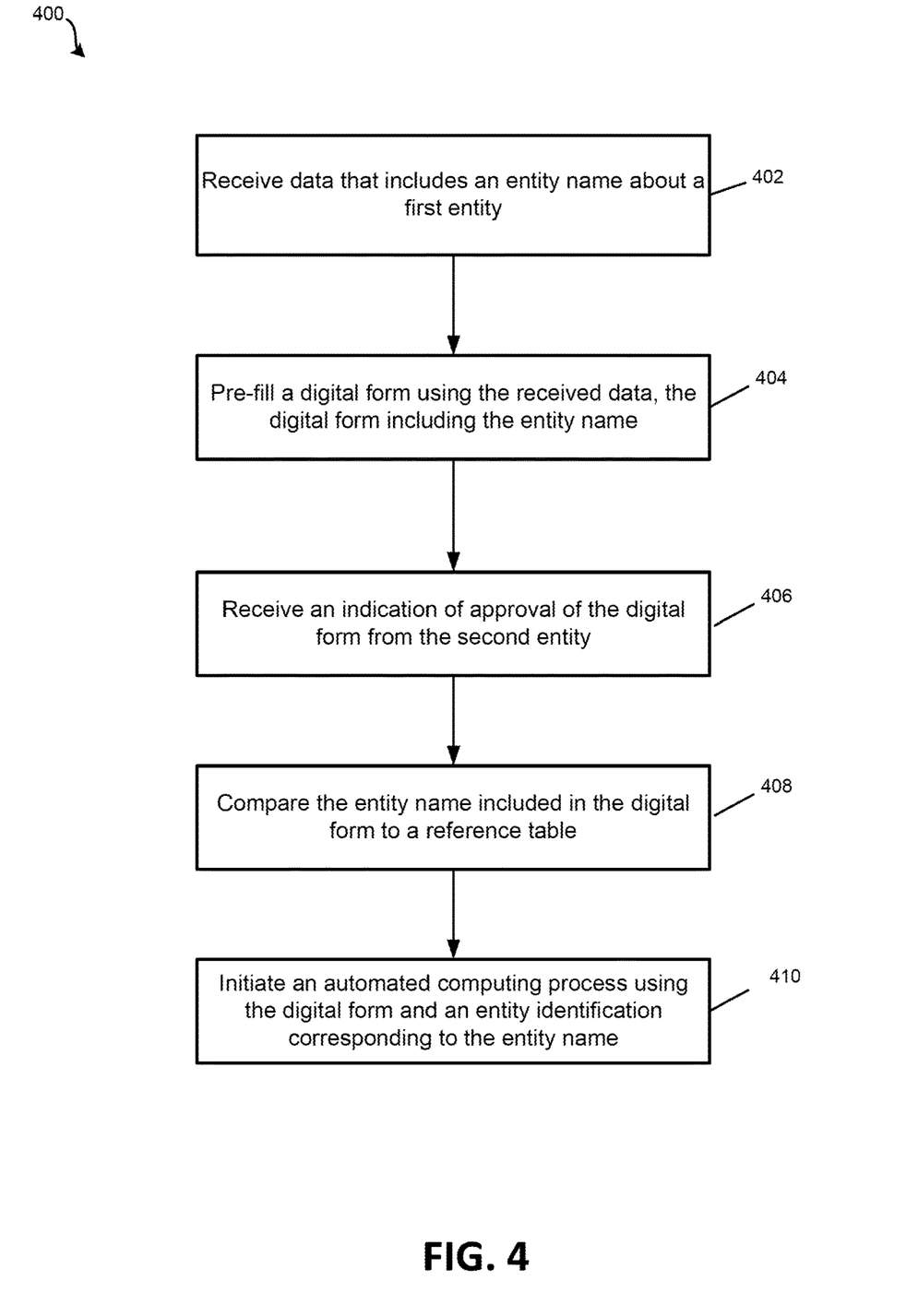
FIG. 4 is a flow chart of a process for efficiently initiating automated processes according to one aspect of the present disclosure.

FIG. 4 is a flow chart of a process 400 for efficiently initiating automated processes according to one aspect of the present disclosure. At block 402, the server 200 receives data about a first entity. The data can include at least an entity name that can correspond to a second entity. In some examples, the first entity can be or otherwise include a financial institution (e.g., a bank, investment firm, etc.), and the second entity can be a user of financial services or other suitable individual that may be associated with the first entity. The first entity and the second entity can be or include any other suitable types of entities that can be involved with initiating automated processes.

In some examples, the server 200 can provide a user interface or other suitable interactive computing environment to the second entity. The second entity can use the user interface to input various data relating to an automated process. For example, the server 200 can provide a digital account planning experience in which the second entity can input identification information associated with the second entity, the entity name, which may correspond to the first entity, a list of user accounts associated with the first entity and the second entity, goals of the account, and other suitable input information. The user interface can transmit the input information to the server 200. In response to receiving the input from the second entity, the server 200, the user interface or other suitable interactive computing environment, or other suitable component (e.g., a financial aggregator, etc.) can gather held-away data relating to the first entity, the second entity, or a combination thereof.

At block 404, the server 200 pre-fills a digital form using the received data. The received data, including the entity name, the held-away data, and other suitable data and metadata relating to the received data, can be used to automatically pre-fill a digital form or other suitable type or class of document. The digital form can be associated with the second entity. For example, the second entity may be interested in requesting a data transfer or other suitable type of transfer. In one such example, the second entity may request or otherwise want to transfer assets or other suitable financial funds, and the digital form may allow or may otherwise be used for initiating such a transfer. Upon the server 200 pre-filling the digital form, the digital form may be complete. In other examples, however, the digital form may be incomplete following the pre-filling operation, and in such examples, the server 200 can request more information.

At block 406, the server 200 receives an indication of approval from the second entity. The indication of approval may be related to the digital form. For example, the indication of approval can be or otherwise include an authorization (e.g., to proceed with an interaction involving the digital form, to submit the digital form, etc.) from the second entity about the digital form. The authorization can include a digital signature, a username/password login combination, or other suitable types of authorizations. In some examples, the pre-filling operation (e.g., described with respect to the block 404) may not generate a complete digital form. In these examples, the server 200 may request (e.g., via a subsequent user interface or other suitable interactive computing environment) additional information that may complete the digital form.

At block 408, the server 200 compares the entity name included in the digital form to a reference table. The reference table can include a set of entity names that can correspond to a set of entity identifications. In some examples, the entity name included in the digital form can match or otherwise correspond to an entity name in the reference table. The server 200 can identify the entity name in the reference table and can determine whether the entity name in the reference table matches or otherwise corresponds to the entity name in the digital form. Additionally, the server 200 can determine that the first entity can include an entity identification similar or identical to the entity identification in the reference table corresponding to the entity name in the reference table.

The reference table can be generated prior to the comparison described herein. For example, the server 200 can periodically (e.g., each day, each week, each month, etc.) compile data from a third entity (e.g., an organization such as National Financial Services, etc.) in which the compiled data can include the entity names and corresponding entity identifications. In some examples, the server 200 can maintain the reference table by parsing the data from the third entity and determining whether any entity names or entity identifications have changed or whether new entity names or entity identifications are included. The server 200 can perform other suitable operations relating to generating and maintaining the reference table.

At block 410, the server 200 initiates an automated process using the digital form and the entity identification. In response to determining the entity identification corresponding to the entity name, the server 200 can initiate the automated process, for example by making one or more API calls. A first API call can include the server 200 making an API call to the first entity to determine whether the first entity can proceed with, or is otherwise configured to proceed with, the requested automated process. Additionally, the server 200 can make a second API call, for example in response to determining via the first API call that the first entity can proceed with the automated process, to initiate the requested automated process. The second API call can include transmitting the approved digital form to the first entity for initiating the automated process, which can involve the first entity, the second entity, and other suitable entities.

The automated process can include various automated computing processes or operations. For example, the automated process can include the ACATS automated process, which can allow the first entity to transfer accounts, assets, data, and other suitable tangible or intangible property associated with the second entity to the server 200. The automated process can include other suitable automated processes (e.g., straight-through processing, etc.) for transferring data or other suitable property of the second entity. In response to the automated process completing, the server 200 may generate an account associated with the second entity, and the account may include property (e.g., assets, data, etc.) associated with the second entity that was transferred from the first entity.

The foregoing description of the examples, including illustrated examples, of the subject matter has been presented only for the purpose of illustration and description and is not intended to be exhaustive or to limit the subject matter to the precise forms disclosed. Numerous modifications, adaptations, combinations, and uses thereof can be apparent to those skilled in the art without departing from the scope of the subject matter.

What is claimed is:

1. A server comprising:
   a processing device; and
   a non-transitory computer-readable medium comprising instructions that are executable by the processing device to cause the server to perform operations, the operations comprising:
   receiving a request to execute an automated account-transfer process on behalf of a user for transferring a financial account from a first financial entity to a second financial entity that is different from the first financial entity;
   receiving, via a first user interface, data about the financial account held by the user with the first financial entity, the data including at least (i) an identification of the first financial entity, (ii) a name of the user, (iii) account data associated with the financial account, and (iv) an IP address associated with the user;
   gathering, based on the data received via the first user interface, additional data associated with the user and the first financial entity, the additional data absent from received data;
   determining, based on a type of process of the automated account-transfer process, a plurality of fields specific to the type of process for including in a pre-filled digital form;
   generating the pre-filled digital form by prefilling a digital form with the plurality of fields specific to the type of process, wherein the plurality of fields are fillable with the name of the user, the additional data, and the account data, wherein the pre-filled digital form includes the plurality of fields and an authorization field separate from the plurality of fields, wherein the name of the user is populated in a first field of the plurality of fields, and wherein the identification is populated in a second field of the plurality of fields;
determining that one or more fields of the plurality of fields are empty after generating the pre-filled digital form;
in response to determining that the one or more fields are empty, transmitting, via a second user interface that is different than the first user interface, a request to the user requesting additional information for completing the one or more fields, the second user interface comprising (i) a first interactive feature to receive the additional information and (ii) a second interactive feature to request approval from the user of remaining fields of the plurality of fields;
providing the pre-filled digital form to the user for approval;
receiving an approval of the pre-filled digital form from the user, the approval comprising (i) a confirmation that data included in the pre-filled digital form is correct and (ii) additional information for completing one or more empty fields of the pre-filled digital form;
accessing a pre-existing reference table that includes one or more entity names and a first plurality of identifications;
determining, based on a received list of entity names and identifications, that the one or more entity names or the first plurality of identifications included in the pre-existing reference table are not the same as the received list of entity names and identifications;
generating, in response to the determination and based on the received list of entity names and identifications, an updated reference table based on the pre-existing reference table and by updating the one or more entity names and the first plurality of identifications to be second one or more entity names and a second plurality of identifications based on the received list;
accessing the updated reference table for determining an entity identification of the second plurality of identifications corresponding to the first financial entity based on the identification, the operation of accessing the reference table comprising:
automatically validating the pre-filled digital form using the second one or more entity names included in the reference table, and
automatically digitally mapping an identity of the first financial entity by comparing the identification of the first financial entity included in the pre-filled digital form to the second one or more entity names included in the reference table for determining a verified identification of the first financial entity; and
based on receiving the approval of the pre-filled digital form and in response to automatically validating the pre-filled digital form, automatically executing the automated account-transfer process, wherein the automated account-transfer process is implemented using the entity identification and the pre-filled digital form.

2. The server of claim 1, wherein the reference table includes a plurality of financial entity names corresponding to a plurality of financial entity identifications, and wherein the operations further comprise generating the reference table based on data received from a financial-service-providing entity.

3. The server of claim 2, wherein the operations include:
determining that the identification of the first financial entity is one of the second plurality of identifications included in the reference table.

4. The server of claim 1, wherein the operation of initiating the automated account-transfer process includes:
making a first application programming interface (API) call to the first financial entity to determine whether the automated account-transfer process is compatible with the first financial entity; and
in response to determining that the automated account-transfer process is compatible with the first financial entity, making a second API call to the first financial entity for initiating a transfer of the financial account.

5. The server of claim 4, wherein the operations involve receiving, from the first financial entity, authorization to make the first API call and the second API call for initiating the transfer of the financial account.

6. The server of claim 1, wherein the automated account-transfer process is configured to transfer money from the first financial entity to the second financial entity, and wherein the operation of initiating the automated account-transfer process includes:
transmitting the entity identification to a separate entity; and
receiving a validation of the entity identification from the separate entity.

7. The server of claim 1, wherein the financial account is a first financial account, and wherein the automated account-transfer process involves generating a second financial account for the user with the second financial entity, wherein the second financial account is generated based on a financial planning experience process provided to the user by the second financial entity.

8. A method comprising:
receiving, by a processing device, a request to execute an automated account-transfer process on behalf of a user for transferring a financial account from a first financial entity to a second financial entity that is different from the first financial entity;
receiving, by the processing device and via a first user interface, data about the financial account held by the user with the first financial entity, the data including at least (i) an identification of the first financial entity, (ii) a name of the user, (iii) account data associated with the financial account, and (iv) an IP address associated with the user;
gathering, by the processing device and based on the data received via the first user interface, additional data associated with the user and the first financial entity, the additional data absent from received data;
determining, by the processing device and based on a type of process of the automated account-transfer process, a plurality of fields specific to the type of process for including in a pre-filled digital form;
generating, by the processing device, the pre-filled digital form by prefilling a digital form with the plurality of fields specific to the type of process, wherein the plurality of fields are fillable with the name of the user, the additional data, and the account data, wherein the pre-filled digital form includes the plurality of fields and an authorization field separate from the plurality of fields, wherein the name of the user is populated in a first field of the plurality of fields, and wherein the identification is populated in a second field of the plurality of fields;

determining, by the processing device, that one or more fields of the plurality of fields are empty after generating the pre-filled digital form;

in response to determining that the one or more fields are empty, transmitting, by the processing device and via a second user interface that is different than the first user interface, a request to the user requesting additional information for completing the one or more fields, the second user interface comprising (i) a first interactive feature to receive the additional information and (ii) a second interactive feature to request approval from the user of remaining fields of the plurality of fields;

providing, by the processing device, the pre-filled digital form to the user for approval;

receiving, by the processing device, an approval of the pre-filled digital form from the user, the approval comprising (i) a confirmation that data included in the pre-filled digital form is correct and (ii) additional information for completing one or more empty fields of the pre-filled digital form;

accessing, by the processing device, a pre-existing reference table that includes one or more entity names and a first plurality of identifications;

determining, by the processing device and based on a received list of entity names and identifications, that the one or more entity names or the first plurality of identifications included in the pre-existing reference table are not the same as the received list of entity names and identifications;

generating, by the processing device and in response to the determination and based on the received list of entity names and identifications, an updated reference table based on the pre-existing reference table and by updating the one or more entity names and the first plurality of identifications to be second one or more entity names and a second plurality of identifications based on the received list;

accessing the updated reference table for determining an entity identification of the second plurality of identifications corresponding to the first financial entity based on the identification, the accessing comprising:
  automatically validating the pre-filled digital form using the second one or more entity names included in the reference table, and
  automatically digitally mapping an identity of the first financial entity by comparing the identification of the first financial entity included in the pre-filled digital form to the second one or more entity names included in the reference table for determining a verified identification of the first financial entity; and based on receiving the approval of the pre-filled digital form and in response to automatically validating the pre-filled digital form, automatically executing, by the processing device, the automated account-transfer process, wherein the automated account-transfer process is implemented using the entity identification and the pre-filled digital form.

9. The method of claim 8, wherein the reference table includes a plurality of financial entity names corresponding to a plurality of financial entity identifications, further comprising generating, by the processing device, the reference table based on data received from a financial-service-providing entity.

10. The method of claim 9, wherein the method further comprises:

determining, by the processing device, that the identification of the first financial entity is one of the second plurality of identifications included in the reference table.

11. The method of claim 8, wherein initiating the automated account-transfer process includes:
  making, by the processing device, a first application programming interface (API) call to the first financial entity to determine whether the automated account-transfer process is compatible with the first financial entity; and
  in response to determining that the automated account-transfer process is compatible with the first financial entity, making, by the processing device, a second API call to the first financial entity for initiating a transfer of the financial account.

12. The method of claim 11, further comprising receiving, by the processing device and from the first financial entity, authorization to make the first API call and the second API call for initiating the transfer of the financial account.

13. The method of claim 8, wherein the automated account-transfer process involves using the entity identification to transfer financial account data, and wherein initiating the automated account-transfer process includes:
  transmitting the entity identification to a separate entity; and
  receiving a validation of the entity identification from the separate entity.

14. The method of claim 8, wherein the financial account is a first financial account, and wherein the automated account-transfer process involves generating a second financial account for the user with the second financial entity, wherein the second financial account is generated based on a financial planning experience process provided to the user by the second financial entity.

15. A non-transitory computer-readable medium comprising instructions that are executable by a processing device for performing operations, the operations comprising:
  receiving a request to execute an automated account-transfer process on behalf of a user for transferring a financial account from a first financial entity to a second financial entity that is different from the first financial entity;
  receiving, via a first user interface, data about the financial account held by the user with the first financial entity, the data including at least (i) an identification of the first financial entity, (ii) a name of the user, (iii) account data associated with the financial account, and (iv) an IP address associated with the user;
  gathering, based on the data received via the first user interface, additional data associated with the user and the first financial entity, the additional data absent from received data;
  determining, based on a type of process of the automated account-transfer process, a plurality of fields specific to the type of process for including in a pre-filled digital form;
  generating the pre-filled digital form by prefilling a digital form with the plurality of fields specific to the type of process, wherein the plurality of fields are fillable with the name of the user, the additional data, and the account data, wherein the pre-filled digital form includes the plurality of fields and an authorization field separate from the plurality of fields, wherein the name of the user is populated in a first field of the plurality of fields, and wherein the identification is populated in a second field of the plurality of fields;

determining that one or more fields of the plurality of fields are empty after generating the pre-filled digital form;

in response to determining that the one or more fields are empty, transmitting, via a second user interface that is different than the first user interface, a request to the user requesting additional information for completing the one or more fields, the second user interface comprising (i) a first interactive feature to receive the additional information and (ii) a second interactive feature to request approval from the user of remaining fields of the plurality of fields;

providing the pre-filled digital form to the user for approval;

receiving an approval of the pre-filled digital form from the user, the approval comprising (i) a confirmation that data included in the pre-filled digital form is correct and (ii) additional information for completing one or more empty fields of the pre-filled digital form;

accessing a pre-existing reference table that includes one or more entity names and a first plurality of identifications;

determining, based on a received list of entity names and identifications, that the one or more entity names or the first plurality of identifications included in the pre-existing reference table are not the same as the received list of entity names and identifications;

generating, in response to the determination and based on the received list of entity names and identifications, an updated reference table based on the pre-existing reference table and by updating the one or more entity names and the first plurality of identifications to be second one or more entity names and a second plurality of identifications based on the received list;

accessing the updated reference table for determining an entity identification of the second plurality of identifications corresponding to the first financial entity based on the identification, the operation of accessing the reference table comprising:
  automatically validating the pre-filled digital form using the second one or more entity names included in the reference table, and
  automatically digitally mapping an identity of the first financial entity by comparing the identification of the first financial entity included in the pre-filled digital form to the second one or more entity names included in the reference table for determining a verified identification of the first financial entity; and
based on receiving the approval of the pre-filled digital form and in response to automatically validating the pre-filled digital form, automatically executing the automated account-transfer process, wherein the automated account-transfer process is implemented using the entity identification and the pre-filled digital form.

16. The non-transitory computer-readable medium of claim 15, wherein the reference table includes a plurality of financial entity names corresponding to a plurality of financial entity identifications, and wherein the operations further comprise:
  generating the reference table based on data received from a financial-service-providing entity; and
  determining that the identification of the first financial entity is one of the second plurality of identifications included in the reference table.

17. The non-transitory computer-readable medium of claim 15, wherein the operation of initiating the automated account-transfer process includes:
  making a first application programming interface (API) call to the first financial entity to determine whether the automated account-transfer process is compatible with the first financial entity; and
  in response to determining that the automated account-transfer process is compatible with the first financial entity, making a second API call to the first financial entity for initiating a transfer of the financial account.

18. The non-transitory computer-readable medium of claim 17, wherein the operations involve receiving, from the first financial entity, authorization to make the first API call and the second API call for initiating the transfer of the financial account.

19. The non-transitory computer-readable medium of claim 15, wherein the automated account-transfer process is configured to transfer money from the first financial entity to the second financial entity.

20. The non-transitory computer-readable medium of claim 15, wherein the financial account is a first financial account, and wherein the automated account-transfer process involves generating a second financial account for the user with the second financial entity, wherein the second financial account is generated based on a financial planning experience process provided to the user by the second financial entity.

* * * * *